(12) United States Patent
Yang (10) Patent No.: US 7,450,328 B2
(45) Date of Patent: Nov. 11, 2008

(54) METHOD FOR RECORDING BURSTS ON A DISK AND RELATED APPARATUS

(75) Inventor: Won-choul Yang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 176 days.

(21) Appl. No.: 11/593,494

(22) Filed: Nov. 7, 2006

(65) Prior Publication Data

US 2007/0103807 A1 May 10, 2007

(30) Foreign Application Priority Data

Nov. 7, 2005 (KR) ...................... 10-2005-0106033

(51) Int. Cl.
*G11B 5/03* (2006.01)
*G11B 5/02* (2006.01)

(52) U.S. Cl. ........................................ 360/66

(58) Field of Classification Search ................... 360/66, 360/77.13, 75, 57, 60, 67, 118; 331/34
See application file for complete search history.

(56) References Cited

U.S. PATENT DOCUMENTS

| | | | | |
|---|---|---|---|---|
| 3,704,349 A | * | 11/1972 | Goshima et al. | ............... 360/66 |
| 3,798,673 A | * | 3/1974 | Koinuma | ..................... 360/66 |
| 4,187,521 A | * | 2/1980 | Rotter et al. | ................. 360/118 |
| 4,349,848 A | * | 9/1982 | Ishii et al. | ..................... 360/66 |
| 4,703,378 A | * | 10/1987 | Imakoshi et al. | ............... 360/66 |
| 4,829,392 A | * | 5/1989 | Kuniharu | ..................... 360/66 |
| 6,025,971 A | | 2/2000 | Inoue et al. | |
| 6,229,402 B1 | * | 5/2001 | Kataoka et al. | ................ 331/34 |
| 6,351,340 B2 | * | 2/2002 | Dixon | ......................... 360/66 |
| 6,429,992 B1 | * | 8/2002 | Ozue et al. | ..................... 360/66 |
| 7,173,786 B2 | * | 2/2007 | Antoku et al. | ................. 360/66 |
| 2007/0064336 A1 | * | 3/2007 | Hirasaka et al. | .......... 360/77.13 |

FOREIGN PATENT DOCUMENTS

| | | |
|---|---|---|
| EP | 1205911 A2 | 5/2002 |
| EP | 1235205 A2 | 8/2002 |
| JP | 05006729 | 1/1993 |
| JP | 11224473 | 8/1999 |
| JP | 2000-215626 | 8/2000 |
| JP | 2001-014816 | 1/2001 |
| JP | 2003-141834 | 5/2003 |
| JP | 2005-063667 | 3/2005 |

\* cited by examiner

*Primary Examiner*—Fred Tzeng
(74) *Attorney, Agent, or Firm*—Volentine & Whitt, PLLC

(57) ABSTRACT

Embodiments of the invention provide a method for recording bursts on a disk and a related apparatus. In accordance with an embodiment of the invention, a method for recording bursts on a burst field of a servo sector of a disk comprises generating a first write current corresponding to burst data provided by a write channel circuit, and generating a second write current having a higher frequency than the first write current using a high frequency AC current generator, wherein the high frequency AC current generator is independent from the write channel circuit. The method further comprises selectively applying the first write current to a write head in response to a signal and selectively applying the second write current to the write head in response to the signal.

10 Claims, 7 Drawing Sheets

METHOD FOR RECORDING BURSTS ON A DISK AND RELATED APPARATUS

BACKGROUND

1. Field of the Invention

Embodiments of the invention relate to a method for recording bursts on a disk and an apparatus adapted to perform the method. In particular, embodiments of the invention relate to a burst recording method adapted to erase edge-adjacent areas using a high frequency AC current generated by a circuit independent of a write channel circuit, and an apparatus adapted to perform the method.

This application claims priority to Korean Patent Application No. 10-2005-0106033, filed on Nov. 7, 2005, the subject matter of which is hereby incorporated by reference in its entirety.

2. Description of the Related Art

A hard disk drive (HDD) is a data storage device adapted to store data to and read data from at least one disk using a magnetic head. Developments in HDD technology are aimed at increasing the capacity, increasing the density, and reducing the size of an HDD; which increase the number of bits per inch (BPI) stored on a disk (i.e., the disk's storage density in the direction in which the disk rotates), increase the number of tracks per inch (TPI) in the disk (i.e., the disk's storage density in a radial direction), and also necessitate finer control of the position of the head of the HDD.

To read data from or write data to a desired position on a magnetic disk in an HDD, servo information is required in order to properly control the position of a head of the HDD relative to the disk.

Figure 1:
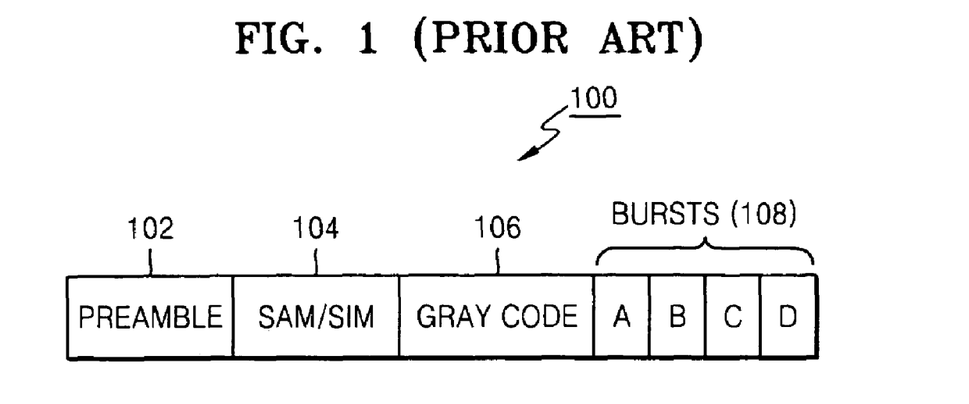
FIG. 1 illustrates the configuration of a servo sector written on a disk.

FIG. 1 illustrates the configuration of a servo sector written on a disk.

Referring to FIG. 1, a servo sector 100 comprises a preamble field 102, a servo address mark/servo index mark (SAM/SIM) field 104, a gray code field 106, and a burst field 108. The preamble field 102 is used to determine a constant timing margin by allocating a gap to the beginning of the servo sector 100 and is used to determine a gain by automatic gain control (AGC). The SAM indicates the beginning of the servo sector 100, and the SIM provides disk one-revolution information. The gray code field 106 provides track and sector numbers, and the burst field 108 is used to obtain position information about a head that is separated from the center of a track (i.e., a head apart from the track center). In general, a four-burst method, which is a method using four types (i.e., kinds) of bursts (wherein the four burst types are A, B, C, and D), is used to control the position of a head.

Figure 2:
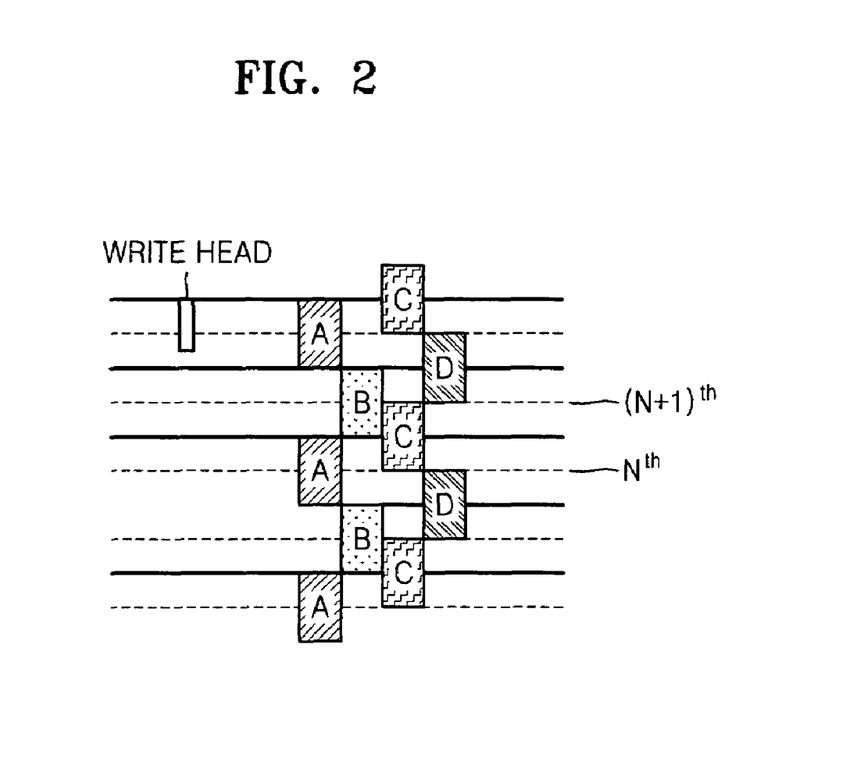
FIG. 2 illustrates bursts written on the disk.

FIG. 2 illustrates bursts A, B, C, and D written on the disk. Referring to FIG. 2, bursts of each of the four burst types A, B, C, and D are respectively written such that they are aligned differently along the tracks, and bursts of each of the four burst types A, B, C, and D are respectively written along different radii of the disk. For example, in FIG. 2, bursts A, C, and D are each at least partially disposed on an $N^{th}$ track, and bursts B, C, and D are each at least partially disposed on an $(N+1)^{th}$ track. On the $N^{th}$ track, burst A is aligned with the center of the track while burst C is shifted by ½ of a track towards the outer edge of the disk and burst D is shifted by ½ of a track towards the center of the disk. In addition, on the $(N+1)^{th}$ track, burst B is aligned with the center of the track while burst C is shifted by ½ of a track towards the center of the disk and burst D is shifted by ½ of a track towards the outer edge of the disk. Thus, in both the $N^{th}$ and the $(N+1)^{th}$ tracks, bursts C and D are shifted in opposite directions with respect to one another.

A process for recording servo information including bursts on a disk is called a servo track write process. Servo track write (STW) methods include an offline STW method, a reference servo track copy method, etc.

To reduce the asymmetry of bursts with respect to radial directions on the disk and to reduce the distortion of the bursts, techniques for erasing areas of a track(s) adjacent to radial edges of a burst (i.e., for erasing both edges of the bursts in the radius direction) have been introduced. For example, a DC-erase method, which is a technique for erasing areas of a disk adjacent to radial edges of bursts (i.e., a technique of erasing both edges of bursts) using a DC current, is disclosed in Japanese Patent Publication No. 9-063217. As used herein, a "radial edge" of a burst is an edge of the burst that is disposed substantially along a radius of the disk, and an area of a track that is adjacent to a radial edge of a burst disposed at least partially on the track may be referred to herein as a "radial-edge-adjacent area."

The DC-erase method can be a positive DC-erase method or a negative DC-erase method, wherein magnetic fields used for erasing in the positive and negative DC-erase methods have opposite directions.

In addition, an AC-erase method exists in which, unlike in the DC-erase method, radial-edge-adjacent areas are erased using a high frequency AC current. The high frequency AC current has a higher frequency than the current used to write the bursts (e.g., a frequency that is more than double the frequency of the current used to write the bursts).

Figure 3:
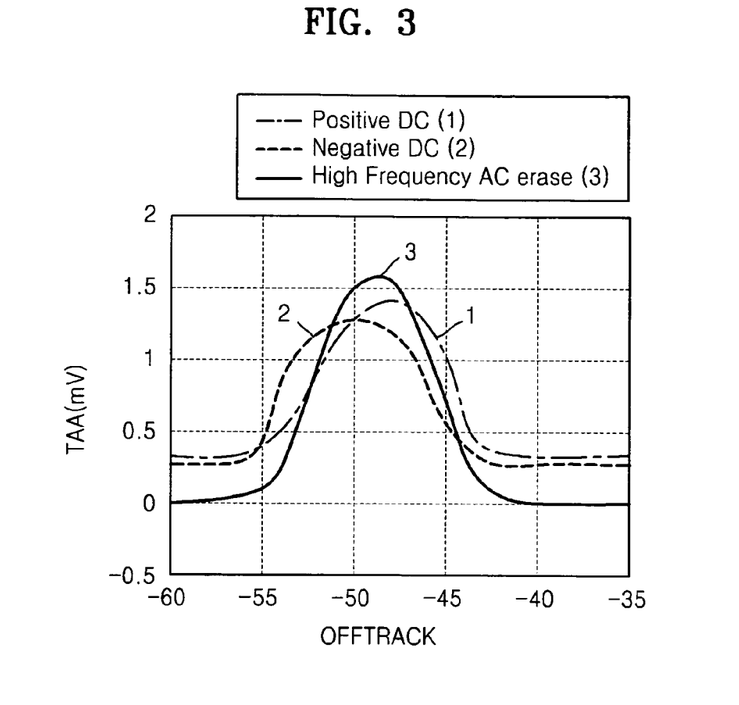
FIG. 3 is a graph showing the effects of DC-erase methods and an AC-erase method.

FIG. 3 is a graph showing the effects of DC-erase methods and an AC-erase method. In FIG. 3, reference numeral 1 denotes a burst trajectory according to the positive DC-erase method, reference numeral 2 denotes a burst trajectory according to the negative DC-erase method, and reference numeral 3 denotes a burst trajectory according to the AC-erase method. In the graph illustrated in FIG. 3, the vertical axis indicates the amplitude of a burst signal read through a head, and the horizontal axis indicates an offset from the track center. Referring to FIG. 3, burst linearity is worst for the positive DC-erase method, better for the negative DC-erase method, and best for the AC-erase method. That is, asymmetry and distortion are reduced most by the AC-erase method.

In particular, the AC-erase method may be used in perpendicular magnetic recording (PMR) to prevent a read bias of a read head from being affected by magnetism remaining in a write head.

Figure 4:
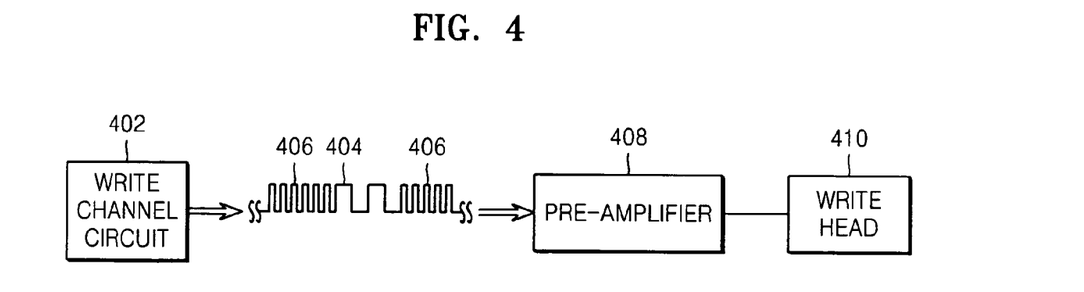
FIG. 4 is a schematic block diagram illustrating a conventional AC-erase method.

FIG. 4 is a schematic block diagram illustrating a conventional AC-erase method. Referring to FIG. 4, a write channel circuit 402 generates burst data 404 and high frequency AC data 406 and outputs the burst data 404 and high frequency AC data 406 to a pre-amplifier 408. The pre-amplifier 408 generates a write current and outputs the write current to a write head 410. The pre-amplifier 408 can generate the write current such that it corresponds to the burst data 404 and can alternatively generate the write current such that it corresponds to the high frequency AC data 406.

As illustrated in FIG. 4, in the conventional AC-erase method, the burst data 404 corresponding to bursts and the high frequency AC data 406 corresponding to a high frequency AC current are both generated by the write channel circuit 402.

In an HDD, the burst frequency is $1/(2T)$, wherein T is the period corresponding to the maximum write frequency. Thus, the burst frequency is correlated to the maximum frequency that data that can be recorded on a disk may have. In addition, operational characteristics of the write channel circuit 402 and the pre-amplifier 408 are correlated to (i.e., matched with) the period T, which is correlated to the maximum write frequency. Thus, when high frequency AC data 406 is generated by the write channel circuit 402, the maximum frequency the high frequency AC data 406 can have is 1/T (i.e., twice the burst frequency).

However, an increase in the storage density of a disk may require that the frequency of the high frequency AC data 406 be much higher than twice the burst frequency. Due to limitations of the write channel circuit 402 and the pre-amplifier 408, however, that requirement cannot be achieved using the conventional AC-erase method.

In addition, using the write channel circuit 402 to generate high frequency AC data having a frequency greater than twice the burst frequency would require a memory device for storing high frequency data and a high frequency clock signal generator, and thereby increase manufacturing cost.

SUMMARY OF THE INVENTION

Embodiments of the invention provide a burst recording method for reducing asymmetry and distortion of bursts by efficiently erasing radial-edge-adjacent areas of a disk and an apparatus adapted to perform the burst recording method.

In accordance with one embodiment, the invention provides a method for recording bursts on a burst field of a servo sector of a disk. The method comprises generating a first write current corresponding to burst data provided by a write channel circuit, and generating a second write current having a higher frequency than the first write current using a high frequency AC current generator, wherein the high frequency AC current generator is independent from the write channel circuit. The method further comprises selectively applying the first write current to a write head in response to a signal, wherein the signal has a first logic level during any one of a plurality of burst write periods and the signal has a second logic level during any one of a plurality of blank periods, and selectively applying the second write current to the write head in response to the signal.

In accordance with another embodiment, the invention provides a method for erasing selected edge-adjacent areas of a disk of a hard disk drive (HDD). The method comprises generating a high frequency AC current using a high frequency AC current generator, wherein the high frequency AC current has a higher frequency than a first write current used to write bursts, and the high frequency AC current generator is independent from a write channel circuit, and applying the high frequency AC current to a write head when the write head is disposed over any one of the selected edge-adjacent areas.

In accordance with another embodiment, the invention provides a hard disk drive (HDD) comprising a disk comprising a servo sector comprising a burst field, wherein the burst field comprises a burst write area and a blank area, and a head adapted to perform a first write operation on the burst field using a first write current corresponding to burst data and having a first frequency, and further adapted to perform a second write operation on the burst field using a second write current having a second frequency higher than the first frequency. The HDD further comprises a write channel circuit adapted to generate the burst data corresponding to bursts, a pre-amplifier adapted to generate the first write current corresponding to the burst data, a high frequency AC current generator adapted to generate the second write current, and a controller adapted to apply the first write current to the head while the head is disposed over the burst write area and adapted to apply the second write current to the head while the head is disposed over the blank area.

BRIEF DESCRIPTION OF THE DRAWINGS

Embodiments of the invention will be described herein with reference to the accompanying drawings, in which like reference symbols indicate like or similar elements throughout. In the drawings.

DESCRIPTION OF EMBODIMENTS

A hard disk drive (HDD) comprises a head disk assembly (HDA), which comprises mechanical components and electrical circuitry.

Figure 5:
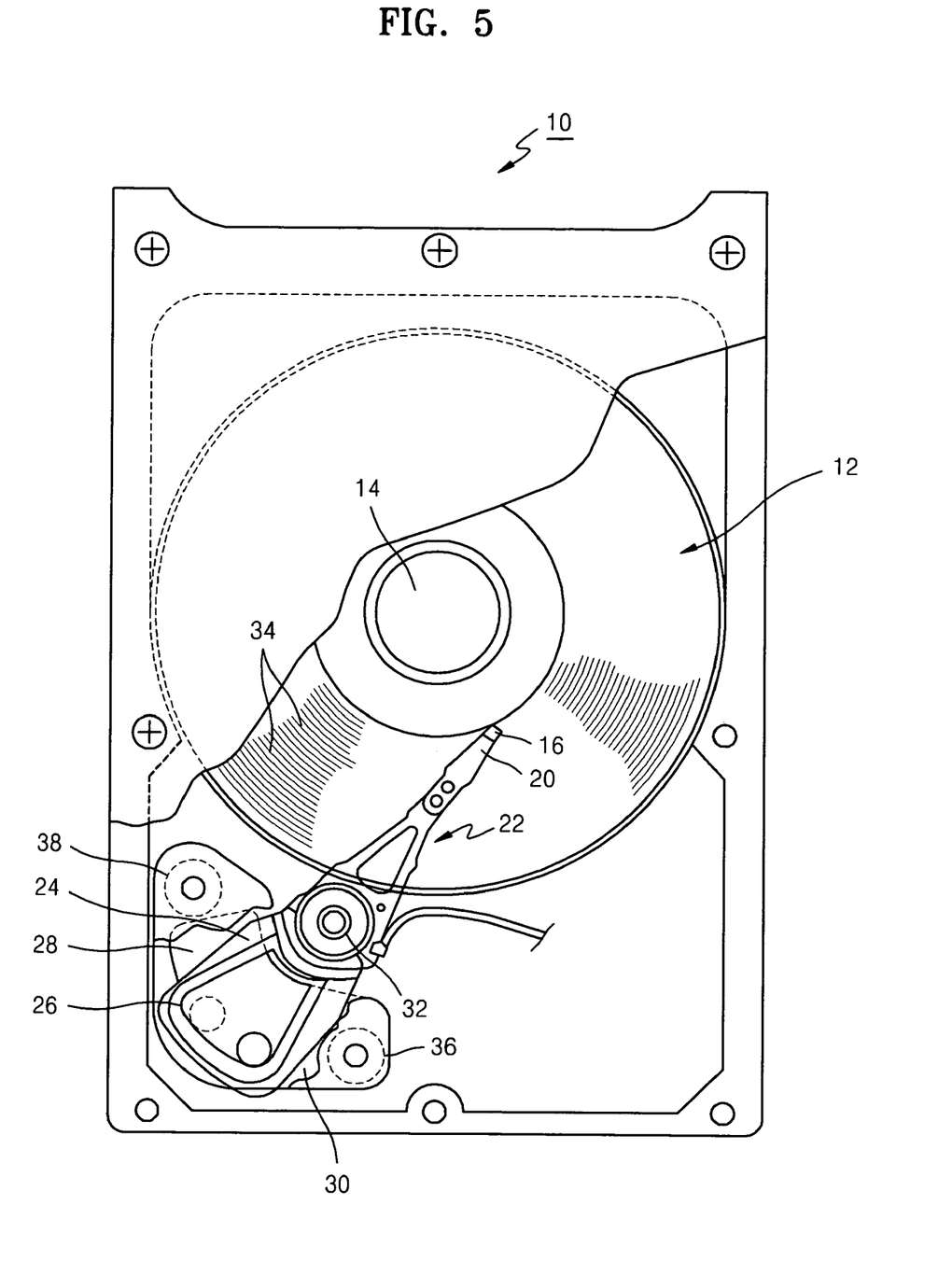
FIG. 5 illustrates a head disk assembly (HDA) of a hard disk drive (HDD)

FIG. 5 illustrates an HDA 10 of an HDD. Referring to FIG. 5, the HDA 10 comprises at least one magnetic disk 12 that a spindle motor 14 is adapted to rotate. The HDA 10 also comprises at least one head 16 disposed adjacent to the surface of the magnetic disk 12.

The head 16 is adapted to read data from the rotating disk 12 (i.e., the disk 12) by sensing a magnetic field formed on the disk 12 and is also adapted to write data to the disk 12 by magnetizing the disk 12. Typically, the head 16 is disposed near (i.e., approaches) the surface of the disk 12. Though a single head 16 is shown in FIG. 5, the head 16 comprises a write head adapted to magnetize the disk 12 and a separate read head adapted to sense a magnetic field formed on the disk 12. In addition, the read head comprises a magneto-resistive (MR) component.

The head 16 may be mounted on a slider (not shown) shaped such that it generates an air bearing between the head 16 and the disk 12, and the slider may be attached to a suspension 20. The suspension 20 is attached to a head stack assembly (HSA) 22. The HSA 22 is attached to an actuator arm 24 comprising a voice coil 26. The voice coil 26 and a magnetic assembly 28 form a voice coil motor (VCM) 30. A current supplied to the voice coil 26 generates a torque that rotates the actuator arm 24 around a bearing assembly 32. The rotation of the actuator arm 24 moves the head 16 across the disk 12.

Information is stored in concentric tracks of the disk 12. In general, each track 34 comprises a plurality of servo sectors and data sectors. The data sectors are disposed between servo sectors and each servo sector is configured as illustrated in FIG. 1.

Figure 6:
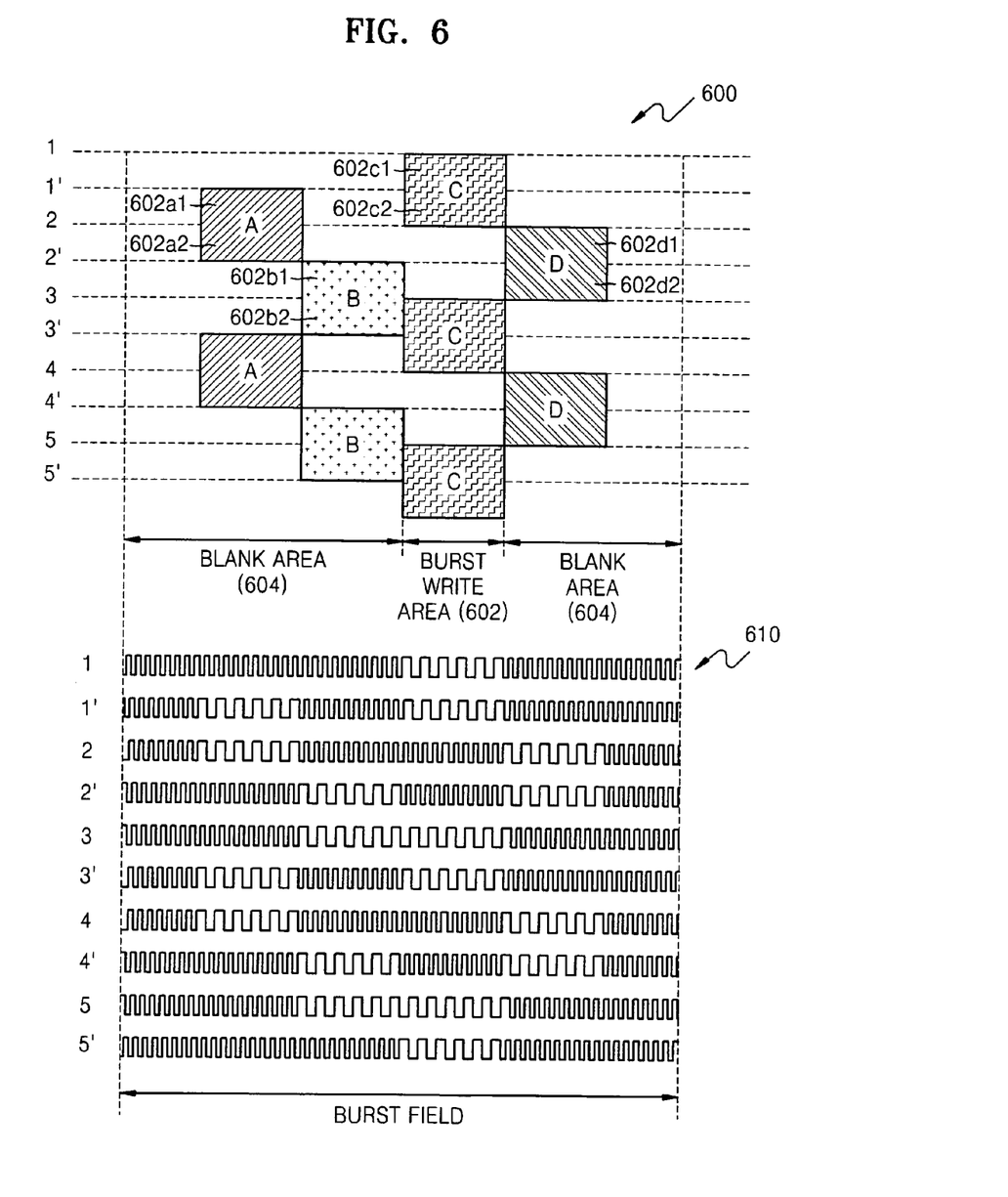
FIG. 6 illustrates a process for recording the bursts illustrated in FIG. 2.

FIG. 6 illustrates a process for recording bursts A, B, C, and D illustrated in FIG. 2. FIG. 6 shows a burst field in which bursts A, B, C, and D are written. In particular, FIG. 6 shows a first depiction 600 of the burst field and a second depiction 610 of the same burst field.

The bursts A, B, C, and D are written in the burst field by repeatedly using a write head to write a portion of at least one burst on one half of a track (i.e., a half track) and then moving the write head by ½ of a track in a radial direction towards an inner edge of the disk 12 and away from an outer edge of the disk 12 (i.e., towards a lower side of first or second depiction 600 or 610 and away from an upper side of first or second depiction 600 or 610, respectively). In general, the bursts A, B, C, and D are all written using a current having the same frequency (i.e., all have the same frequency). Each half of each track (i.e., each half track) in a burst field comprises a burst write area 602 in which a portion of a burst is written and a blank area 604 in which no portion of a burst is written. The locations of the burst write area(s) 602 and the blank areas 604 of a half track vary between tracks and in accordance with the type of burst(s) of which a portion will be written to a given half track. The burst write area 602 and the blank areas 604 illustrated in FIG. 6 correspond to both half track 1 and half track 5'. In addition, an erase operation is performed on each blank area 604 using a high frequency AC write current to thereby erase selected radial-edge-adjacent areas in each half track of the burst field. As used herein, a "half track" is a half of a track. Also, in first depiction 600, each of reference symbols 1-5' corresponds to the half track disposed directly under the dotted line adjacent to it.

A process for writing bursts A, B, C, and D in a first portion of the burst field of FIG. 6 will now be described. First, a first portion of the burst C is written to a half track 1 (i.e., the upper side of a first track) by positioning the write head over (i.e., to follow) half track 1 as the disk 12 rotates. That is, the write head writes the first portion of burst C in burst write area 602 (a first burst C write area 602c1) disposed in half track 1 and erases the radial-edge-adjacent areas of the first portion of burst C, which are disposed in the blank areas 604 of the half track 1, using a high frequency AC current. Second, the write head is positioned over half track 1' (i.e., the lower side of the first track) and then writes a first portion of burst A in a first burst A write area 602a1, writes a second portion of burst C in a second burst C write area 602c2, and also erases the radial-edge-adjacent areas of the first portion of burst A and the second portion of burst C, which are disposed in blank areas of the half track 1', using the high frequency AC current. Third, the write head is positioned over half track 2 (i.e., the upper side of a second track) and then writes a second portion of the burst A in a second burst A write area 602a2, writes a first portion of the burst D in a first burst D write area 602d1, and also erases the radial-edge-adjacent areas of the second portion of burst A and the first portion of burst D, which are disposed in blank areas of half track 2, using the high frequency AC current. Fourth, the write head is positioned over half track 2' (i.e., the lower side of the second track) and then writes a first portion of the burst B in a first burst B write area 602b1, writes a second portion of the burst D in a second burst D write area 602d2, and also erases the radial-edge-adjacent areas of the first portion of the burst B and the second portion of the burst D, which are disposed blank areas of half track 2', using the high frequency AC current. Then, the write head is positioned over half track 3 (i.e., the upper side of the third track) and then writes a second portion of the burst B in a second burst B write area 602b2, writes a first portion of a second burst C in a second burst C write area 602, and also erases one radial-edge-adjacent area of the second portion of the burst B and one radial-edge-adjacent area of the first portion of the second burst C, each of which is disposed in a blank area of half track 3, using the high frequency AC current.

In a similar manner, a second portion of second burst C and additional bursts A, B, C, and D are written in the burst field by changing the position of the write head in the radial direction and varying the locations of the burst write area(s) 602 and the blank area(s) 604 in successive half tracks.

FIG. 6 shows that selected radial-edge-adjacent areas of the bursts A, B, C, and D are erased by erase operations in which a high frequency AC write current is applied to a write head when the write head is disposed over the selected radial-edge-adjacent areas. By performing the erase operation, the linearity of bursts along radial directions of the disk is increased and the distortion of the bursts is reduced.

Figure 7:
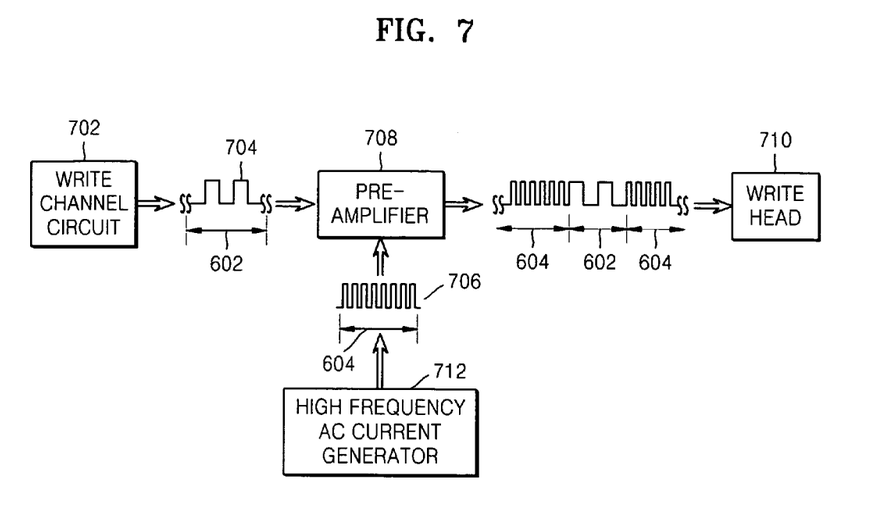
FIG. 7 is a schematic block diagram illustrating a burst recording method in accordance with an embodiment of the invention.

FIG. 7 is a schematic block diagram illustrating a burst recording method in accordance with an embodiment of the invention. Referring to FIG. 7, a write channel circuit 702 generates burst data 704 corresponding to a burst, wherein a portion of that burst will be written in a burst write area 602, and outputs the burst data 704 to a pre-amplifier 708. A high frequency AC current generator 712 generates a high frequency AC write current 706 to be applied to blank areas 604 and outputs the high frequency AC write current 706 to the pre-amplifier 708.

The pre-amplifier 708 is adapted to generate a first write current corresponding to the burst data 704 received from write channel circuit 702, and is adapted to output to a write head 710 either one of the first write current and the high frequency AC write current generated by the high frequency AC current generator 712.

As illustrated in FIG. 7, in the burst recording method in accordance with an embodiment of the invention, the second write current used to perform the erase operation on blank areas 604 is generated by the high frequency AC current generator 712 independently of the write channel circuit 702.

Thus, the frequency of the second write current used for the erase operation can be set independent of the characteristics of the write channel circuit 702 and the pre-amplifier 708.

In addition, in accordance with an embodiment of the invention, the write channel circuit 702 does not need to comprise a memory for quick reading and writing in order to generate high frequency AC data or a clock generator for generating a high frequency clock signal, so manufacturing cost is not increased by the inclusion of those elements.

To perform the burst recording method in accordance with an embodiment of the invention, although the high frequency AC current generator 712 can be configured independent of the write channel circuit 702 and the pre-amplifier 708, the high frequency AC current generator 712 may be disposed in the pre-amplifier 708 (i.e., the pre-amplifier 708 may comprise high frequency AC current generator 712).

In particular, if the pre-amplifier 708 is adapted to perform a degaussing function, an embodiment of the invention in which the pre-amplifier 708 comprises the high frequency AC current generator 712 can be implemented using a degaussing AC current generator disposed in the pre-amplifier 708.

The degaussing function is used to reduce reading and writing difficulties by erasing magnetism remaining on a write head after the write head has finished performing a write operation. The pre-amplifier 708 degausses the write head by causing a high frequency AC current of gradually decreasing amplitude to flow through the write head after the write operation. In accordance with an embodiment of the invention, the degaussing function of the pre-amplifier 708 is used to perform an erase operation on a blank area 604.

Figure 8A:
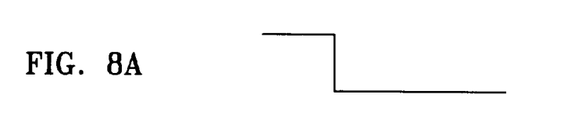
FIGS. 8A through 8C are waveform diagrams illustrating the operation of a pre-amplifier adapted to perform a degaussing function.
Figure 8B:
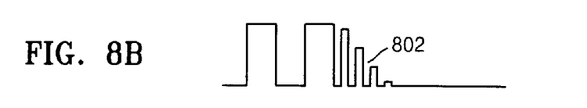
Figure 8C:
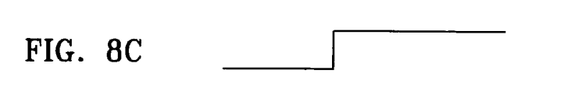

FIGS. 8A through 8C are waveform diagrams illustrating the operation of a pre-amplifier 708 adapted to perform the degaussing function. FIG. 8A shows the waveform of a write control signal, FIG. 8B shows the waveform of a write current, and FIG. 8C shows the waveform of a read bias control signal. The write control signal controls reading and writing of data (i.e., controls whether data is read or written), and the read bias control signal controls whether a read bias is applied to a magneto-resistive head (not shown) in order to read data.

Referring to FIGS. 8A through 8C, a current (i.e., a degaussing current) 802 having an amplitude that gradually decreases is applied to the write head after a write operation has been performed.

Figure 9:
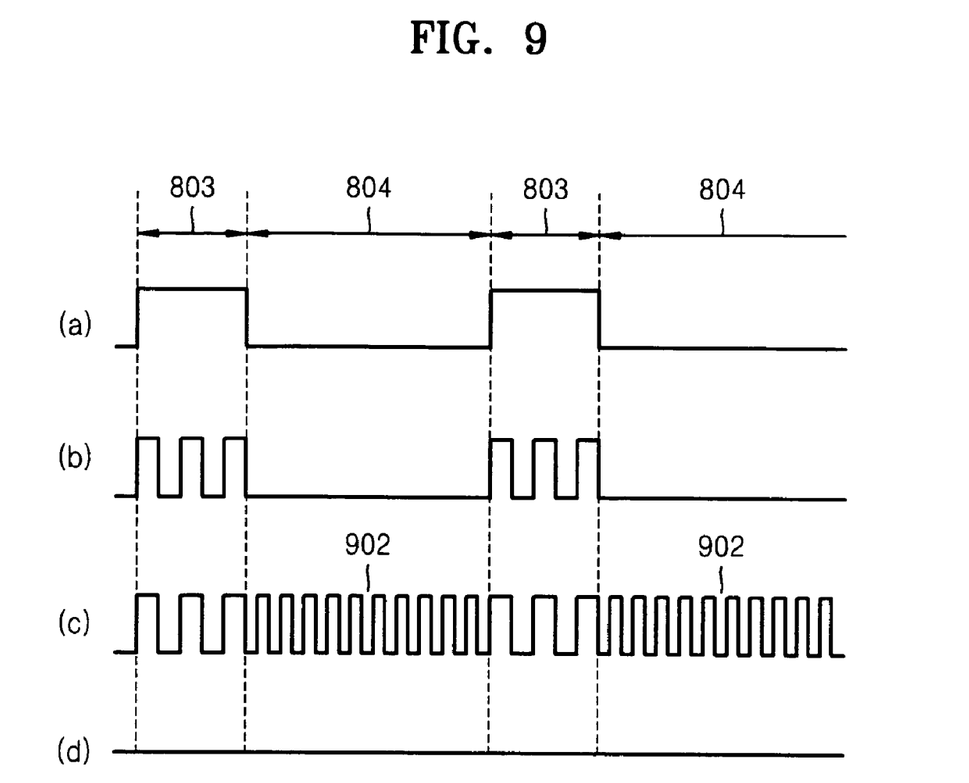
FIG. 9 shows waveform diagrams of signals as a pre-amplifier performs the burst recording method in accordance with an embodiment of the invention; and, FIG. 10 is a block diagram illustrating an electrical circuit of an HDD in accordance with an embodiment of the invention.

FIG. 9 shows waveform diagrams of signals as a pre-amplifier 708 (of FIG. 7) performs a burst recording method in accordance with an embodiment of the invention. Waveform (a) of FIG. 9 illustrates a burst write control signal, waveform (b) of FIG. 9 illustrates burst data, waveform (c) of FIG. 9 illustrates a write current, and waveform (d) of FIG. 9 illustrates a read bias control signal.

The burst write control signal illustrated by waveform (a) has first and second logic levels. When the burst write control signal has the first logic level, the burst write control signal indicates that the HDD is in one of a plurality of burst write periods 803, during each of which a write head is disposed over a burst write area 602. When the burst write control signal has the second logic level, the burst write control signal indicates that the HDD is in one of a plurality of blank periods 804, during each of which a write head is disposed over a blank area 604.

Referring to FIG. 9, in a burst recording method in accordance with an embodiment of the invention, the amplitude of a degaussing current 902 does not decrease during the blank period 804 (i.e., while the write head is disposed over a blank area 604). That is, the erase operation is performed by continuously maintaining the degaussing current 902 or the degaussing function during each blank period 804. In addition, in accordance with the read bias control signal, the read bias is not applied to the read head during the blank periods 804 in order to protect the read head.

Figure 10:
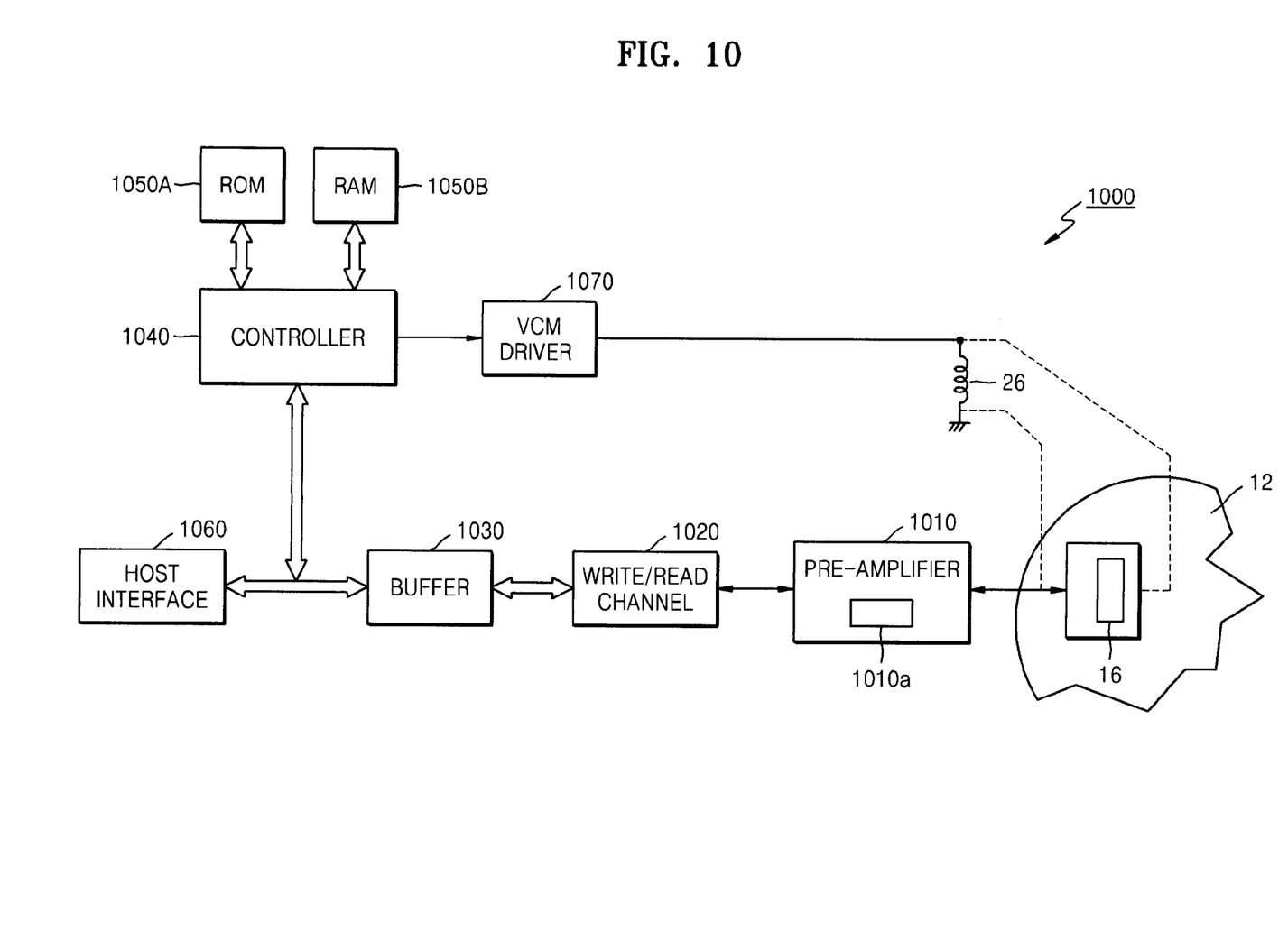

FIG. 10 is a block diagram illustrating an electrical circuit 1000 of an HDD in accordance with an embodiment of the invention. Referring to FIG. 10, the HDD comprises the disk 12, the head 16, a pre-amplifier 1010, a write/read (R/W) channel 1020 (i.e., a write channel circuit), a buffer 1030, a controller 1040, a read only memory (ROM) 1050A, a random access memory (RAM) 1050B, a host interface 1060, and a VCM driver 1070. In addition, the pre-amplifier 1010 comprises a high frequency AC current generator 1010a that is used in performing the erase operation.

The ROM 1050A stores firmware and control information for controlling the electrical circuit 1000 illustrated in FIG. 10, and the RAM 1050B stores information required to drive the HDD, wherein the information required to drive the HDD is read from the ROM 1050A or the disk 12 when the HDD is initialized. In addition, the controller 1040 analyzes a command received from a host device via the host interface 1060 and acts on the analyzed command.

General operation of the HDD will now be described. In a data read mode, the pre-amplifier 1010 of the HDD, in order to aid signal processing, amplifies an electrical signal sensed from the disk 12 by the head 16. The R/W channel 1020 encodes the amplified analog signal into a digital signal readable by a host device (not shown), converts the digital signal to a data stream, temporarily stores the data stream in the buffer 1030, and transmits the stored data stream to the host device via the host interface 1060.

In a data write mode, the HDD receives data from the host device via the host interface 1060, temporarily stores the received data in the buffer 1030, converts the data stored in the buffer 1030 into a binary data stream suitable for a write channel using the R/W channel 1020 by sequentially reading the data stored in the buffer 1030, and records the binary data stream on the disk 12 through the head 16 using a write current amplified by the pre-amplifier 1010.

In a burst write mode, the controller 1040 controls the pre-amplifier 1010 and the high frequency AC current generator 1010a to write the bursts A, B, C, and D by writing selected portions of one or more bursts during each burst write period 803, and to erase selected radial-edge-adjacent areas of the bursts A, B, C, and D by erasing one or more of the selected radial-edge-adjacent areas during each blank period 804 by applying a high frequency AC current to the head 16.

In each burst write period 803, the controller 1040 selects and provides to the head 16 the first write current generated by the pre-amplifier 1010 in accordance with burst data provided by R/W channel 1020 (i.e., a write channel circuit), wherein the burst data corresponds to bursts. In each blank period 804, the controller 1040 selects and provides to the head 16 the second write current generated by the high frequency AC current generator 1010a. In addition, during each burst write period 803 and each blank period 804, the controller 1040 protects the read head by not applying the read bias to the read head (i.e., by controlling the pre-amplifier 1010 and the high frequency AC current generator 110a to not apply a read bias to the head).

Embodiments of the invention may take the form of a method, an apparatus, and/or a system. When an embodiment of the invention is implemented in the form of software, components of the embodiment may be implemented as code segments adapted to execute required operations. The code segments (or a program) can be stored in a processor-readable recording medium and communicated as computer data signals in a carrier using a transmission medium or a communication network. The processor-readable recording medium may be any data storage device adapted to store and communicate data that can thereafter be read by a computer system. Examples of the processor-readable recording medium are electronic circuits, semiconductor memory devices, read-only memory (ROM), flash memory, erasable ROM, floppy disks, optical discs, hard discs, optical fiber media, and RF networks. The computer data signals may comprise any signal that can be propagated via transmission media such as electronic network channels, optical fibers, wireless transmission, electronic fields, and RF networks.

Embodiments of the invention may be implemented in various kinds of disk drives including HDDs and various kinds of data storage devices.

In accordance with at embodiments of the invention, servo control in an HDD may be improved by reducing asymmetry and distortion of bursts in a burst field of a disk in an HDD by erasing selected radial-edge-adjacent areas of bursts using a high frequency AC current generated by a high frequency AC current generator that is independent of a write channel circuit.

Although embodiments of the invention have been described herein, various changes in form and detail may be made in the embodiments by one skilled in the art without departing from the scope of the invention as defined by the accompanying claims.

What is claimed is:

1. A method for recording bursts on a burst field of a servo sector of a disk, the method comprising:

generating a first write current corresponding to burst data provided by a write channel circuit;

generating a second write current having a higher frequency than the first write current using a high frequency AC current generator, wherein the high frequency AC current generator is independent from the write channel circuit;

selectively applying the first write current to a write head in response to a signal, wherein the signal has a first logic level during any one of a plurality of burst write periods and the signal has a second logic level during any one of a plurality of blank periods; and, selectively applying the second write current to the write head in response to the signal.

2. The method of claim 1, wherein the high frequency AC current generator is disposed in a pre-amplifier.

3. The method of claim 2, wherein the high frequency AC current generator is adapted to generate the second write current only when the signal has the second logic level.

4. The method of claim 1, wherein a read head does not receive a read bias when the signal has the second logic level.

5. A method for erasing selected edge-adjacent areas of a disk of a hard disk drive (HDD), the method comprising:

generating a high frequency AC current using a high frequency AC current generator, wherein the high frequency AC current has a higher frequency than a first write current used to write bursts, and the high frequency AC current generator is independent from a write channel circuit; and, applying the high frequency AC current to a write head when the write head is disposed over any one of the selected edge-adjacent areas.

6. The method of claim 5, wherein the high frequency AC current generator is disposed in a pre-amplifier.

7. The method of claim 5, further comprising controlling the HDD to not apply a read bias to a read head while applying the high frequency AC current to the any one of the selected edge-adjacent areas.

8. A hard disk drive (HDD) comprising:

a disk comprising a servo sector comprising a burst field, wherein the burst field comprises a burst write area and a blank area;

a head adapted to perform a first write operation on the burst field using a first write current corresponding to burst data and having a first frequency, and further adapted to perform a second write operation on the burst field using a second write current having a second frequency higher than the first frequency;

a write channel circuit adapted to generate the burst data corresponding to bursts;

a pre-amplifier adapted to generate the first write current corresponding to the burst data;

a high frequency AC current generator adapted to generate the second write current; and, a controller adapted to apply the first write current to the head while the head is disposed over the burst write area and adapted to apply the second write current to the head while the head is disposed over the blank area.

9. The HDD of claim 8, wherein the pre-amplifier comprises the high frequency AC current generator.

10. The HDD of claim 8, wherein the controller is adapted to control the pre-amplifier and the high frequency AC current generator to not apply a read bias to the head while the head is disposed over the blank area.

* * * * *